United States Patent [19]

Pav et al.

[11] Patent Number: 4,757,583
[45] Date of Patent: Jul. 19, 1988

[54] ROLL FOR USE IN CALENDERS AND THE LIKE

[75] Inventors: Josef Pav; Reinhard Wenzel; Richard Rauf, all of Krefeld, Fed. Rep. of Germany

[73] Assignee: Kleinewefers GmbH, Krefeld, Fed. Rep. of Germany

[21] Appl. No.: 927,808

[22] Filed: Nov. 6, 1986

[30] Foreign Application Priority Data

Nov. 7, 1985 [DE] Fed. Rep. of Germany ....... 3539428

[51] Int. Cl.$^4$ ............................................. B21B 27/00
[52] U.S. Cl. ................... 29/116.1; 29/116.2; 100/162 B
[58] Field of Search ................. 29/116, 116 AD, 113, 29/113 AD; 100/162 B

[56] References Cited

U.S. PATENT DOCUMENTS 4,440,077 4/1984 Schiel ............................ 29/116 AD
4,520,723 6/1985 Pav et al. ...................... 29/116 AD Primary Examiner—Timothy V. Eley
Assistant Examiner—Irene Cuda
Attorney, Agent, or Firm—Peter K. Kontler

[57] ABSTRACT

A roll for use in a calender has a stationary carrier for a hollow cylindrical shell whose end portions are supported by combined radial and axial bearings surrounding annular bearing members which, in turn, surround the end portions of the carrier. The carrier defines with each bearing member a set of chambers which are sealed from the atmosphere and can receive pressurized hydraulic fluid to ensure that the end portions of the shell are biased toward a second roll with a requisite force as well that the end portions of the shell are stabilized against lateral and/or other stray movements. The fluid in the chambers ensures that the shell can be acted upon by large forces without unduly stressing the antifriction bearings. The bearing members flank a hydrostatic bearing unit which acts between the central portion of the shell and the carrier.

26 Claims, 4 Drawing Sheets

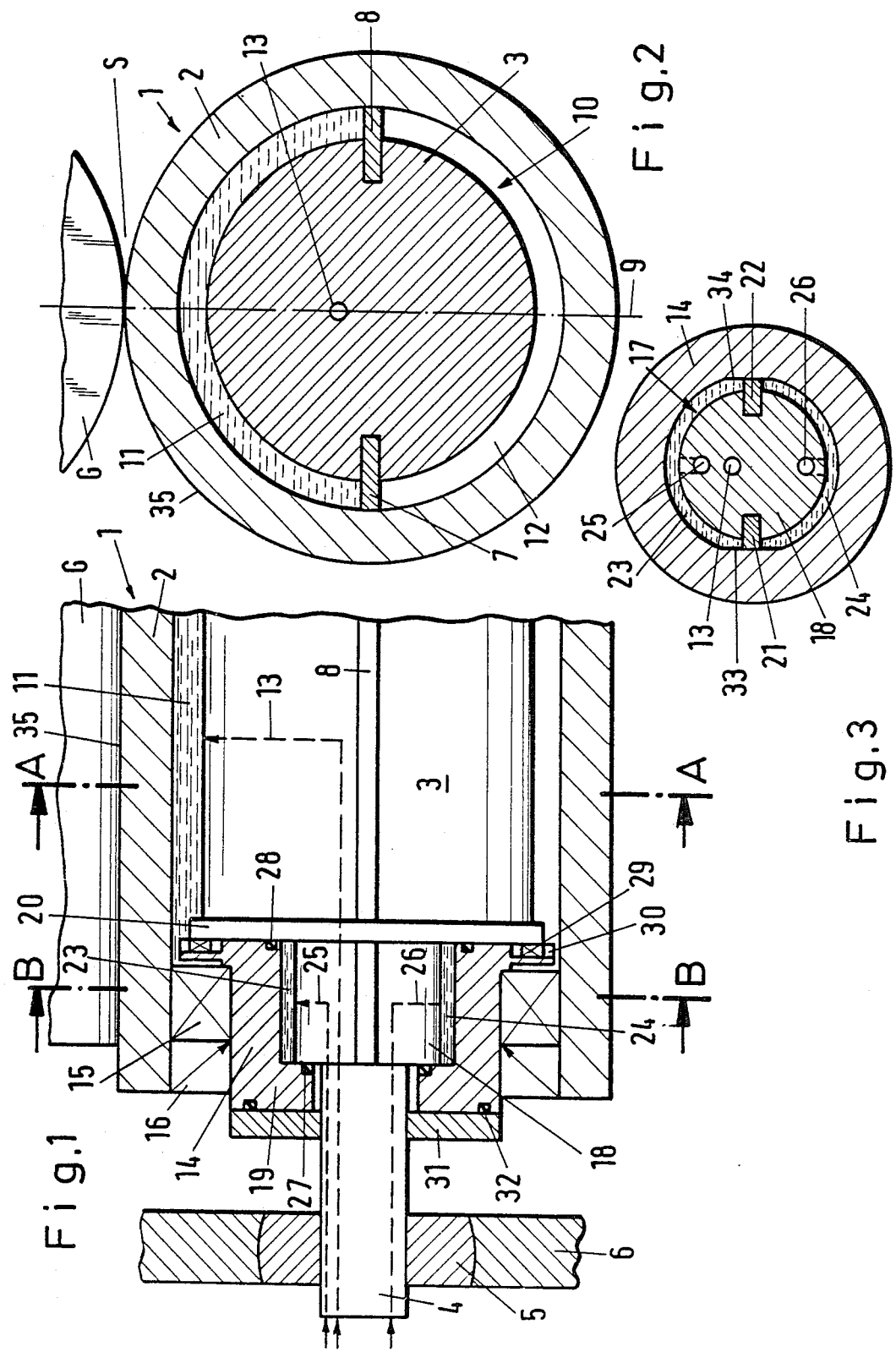

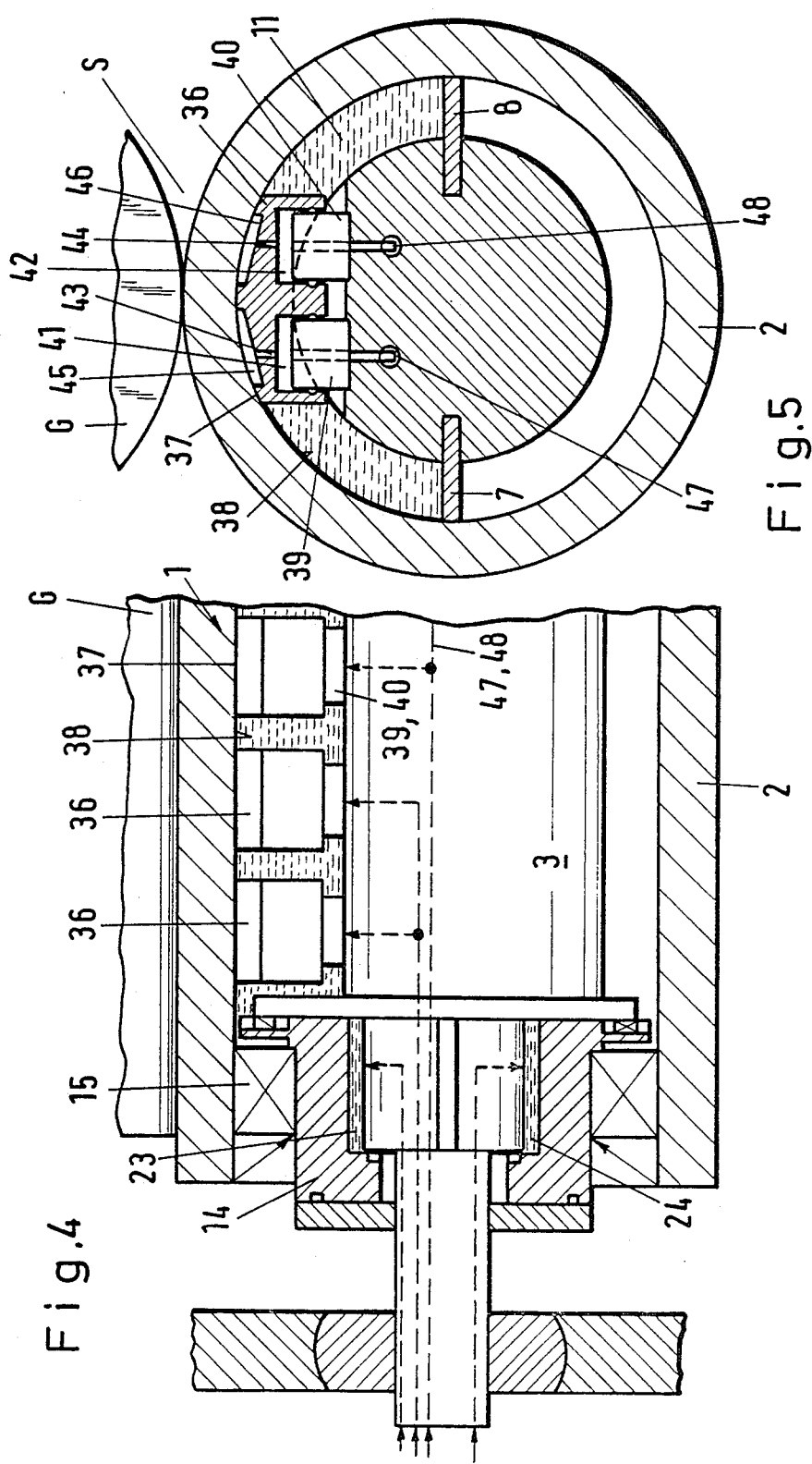

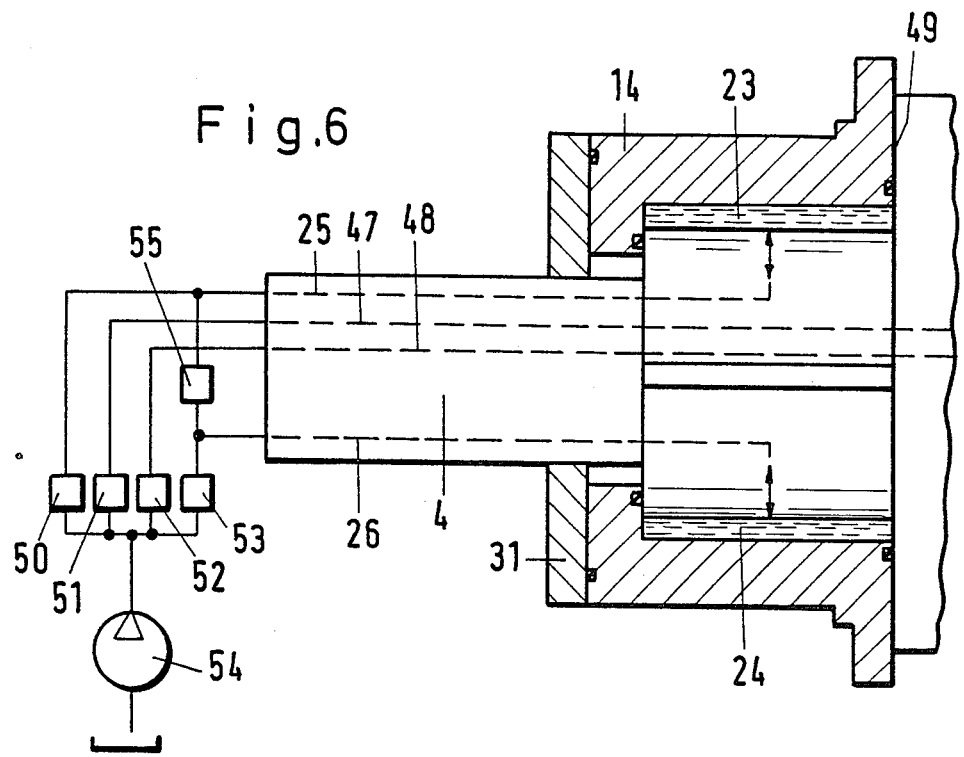
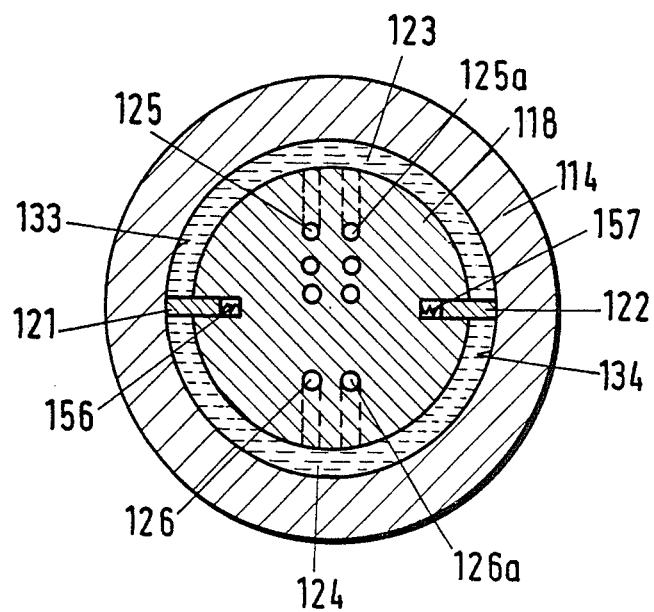

ROLL FOR USE IN CALENDERS AND THE LIKE

CROSS-REFERENCE TO RELATED CASES

The present invention is related to those disclosed in numerous commonly owned granted United States and foreign Letters Patent and pending United States and foreign patent applications including U.S. Pat. Nos. 4,520,723, 4,514,887, 4,498,383, 4,457,057, 4,389,933, 4,328,744, U.S. patent application Ser. Nos. 888,115 filed July 18, 1986, 860,664 filed May 7, 1986 and 726,067 filed Apr. 23, 1985.

Other prior art of which applicants are aware at this time includes U.S. Pat. No. 4,185,879, German Offenlegungsschrift Nos. 30 03 395 and 29 43 644.

BACKGROUND OF THE INVENTION

The present invention relates to rolls for use in calenders and the like. More particularly, the invention relates to improvements in assemblies which include one or more rolls and can be used to treat running webs of textile material, paper, metallic foil, plastic foil or the like. Still more particularly, the invention relates to improvements in assemblies wherein at least one roll is constructed and assembled in such a way that the configuration of its peripheral surface can be changed so as to allow for the application of adequate pressure against any selected portion of the running web, as seen in the longitudinal direction of the nip through which the web is caused to advance.

It is well known to construct an adjustable or deformable roll for use in a calender or the like in such a way that the roll comprises a deformable hollow cylindrical shell which surrounds a stationary carrier. A hydrostatic bearing unit is installed between the carrier and the shell and serves to urge selected portions of the shell against the adjacent portion of the running web with a predetermined force. It is also known to mount the shell on two bearings which are disposed at the ends of the carrier and include annular bearing members movable relative to the carrier in the radial direction of the shell. As a rule, the bearing members are held against rotation relative to the carrier.

A roll of the above outlined character is disclosed in German Pat. No. 28 26 316. It is mounted at a level above a second roll and defines therewith an elongated nip for the passage of the running web. The hydrostatic bearing unit comprises a plurality of hydrostatic bearing elements which can act against the internal surface of the shell, and one or more pressure generating or biasing devices which urge the bearing elements downwardly and away from the carrier. The internal surfaces of the two bearing members are acted upon by pistons which tend to lift the shell against the action of gravity and in a direction away from the second roll.

A different roll is disclosed in German Pat. No. 31 38 365. In the assembly which is described in this patent, the shell is disposed below the second roll and the annular bearing members are acted upon by pistons serving to take up the weight of the shell as well as of any other parts which share the movements of the shell. This exhibits the advantage that the weight of the shell and the weight of any parts which are movable therewith need not be taken into consideration during selection of pressures which are applied by way of the hydrostatic bearing unit so as to regulate the pressure in the nip. In each of the aforedescribed conventional rolls, the space within the central portion of the shell communicates with the spaces within the annular bearing members.

The patented proposals exhibit the drawback that the pistons which act upon the bearing members are highly likely to cause a pronounced deformation of bearing members and of antifriction bearings which are associated with such bearing members. This applies especially when the roll is designed to take up and transmit substantial forces.

OBJECTS AND SUMMARY OF THE INVENTION

An object of the invention is to provide a novel and improved roll for use in calenders or the like wherein the bearings at the ends of the carrier for the radially movable shell are constructed and assembled in such a way that they can stand pronounced stresses without undue deformation and can perform a number of other important and useful functions.

Another object of the invention is to provide novel and improved bearings for the end portions of a hollow cylindrical shell which is used in the above outlined roll.

Another object of the invention is to provide a machine which embodies one or more rolls of the above outlined character.

A further object of the invention is to provide a novel and improved method of regulating the pressure at the ends of the nip between two cooperating rolls in a calender or the like.

Still another object of the invention is to provide a novel and improved assembly of rolls which define an elongated nip, and to construct the assembly in such a way that the pressure upon the material which runs through the nip can be altered within a wide range and with a high degree of accuracy.

A further object of the invention is to provide a novel and improved method of treating a web of textile or other material which is running through the nip of two rolls in a calender or a like machine.

The invention resides in the provision of an assembly for treating running webs, particularly for use in calenders and the like. The assembly comprises a roll including an elongated carrier, means for non-rotatably supporting the carrier, a hollow deformable rotary cylindrical shell spacedly surrounding the carrier, hydrostatic bearing means interposed between the carrier and the shell, and first and second bearings interposed between the shell and the carrier and flanking the hydrostatic bearing means. Each of the bearings includes an annular bearing member which is non-rotatably mounted on and surrounds the carrier and is movable relative to the carrier radially of the shell. Each bearing member defines with the carrier an annular clearance, and each bearing further comprises means for sealing the clearance from the atmosphere, means for subdividing the clearance into a plurality of chambers, a source of pressurized fluid, and means for admitting the fluid from the source into at least one selected chamber of each plurality of chambers.

The bearing members have outer end portions which are remote from the bearing means, and the sealing means can include means for sealing the clearances in the regions of the outer end portions of the respective bearing members. Such bearing members have internal surfaces which are acted upon by pressurized fluid in the selected chambers.

The hydrostatic bearing means extends longitudinally of the shell between predetermined portions of the bearing members, and the aforementioned selected chambers are preferably surrounded by such predetermined portions of the respective bearing members.

The end portions of the shell preferably at least partially surround the bearing members, and the assembly further comprises a second roll which defines with the shell an elongated nip adjacent the bearing means and aforementioned portions of the bearing members. The fluid in the selected chambers is preferably arranged to bias the end portions of the shell in a direction to reduce the width of the corresponding portions of the nip.

If desired, the hydrostatic bearing means and the selected chambers can be disposed at opposite sides of the carrier.

In accordance with a presently preferred embodiment of the invention, the hydrostatic bearing means comprises a row of hydrostatic bearing elements which are adjacent the internal surface of the shell, and a plurality of pressure generating units which act between the carrier and each of the bearing elements to urge the respective bearing elements toward the internal surface of the shell.

Alternatively, the hydrostatic bearing means can include a plenum chamber or compartment which is disposed between the shell and the carrier and extends longitudinally of the shell intermediate the two bearing members. Such compartment can be provided in addition to or instead of the aforementioned bearing elements and pressure applying means. The hydrostatic bearing means which includes a compartment can further comprise elongated sealing devices in the form of partitions which are interposed between the shell and the carrier, which flank the compartment, and which are spaced apart from each other in the circumferential direction of the shell.

Means is preferably provided for adjusting the pressure of fluid in at least one of the selected chambers. Furthermore, the two bearings preferably comprise means for admitting pressurized fluid to at least one second (secondary) chamber of each plurality of chambers, and means for maintaining the fluid in the selected chambers at a pressure which is higher than the pressure in the second (secondary) chambers.

The arrangement may be such that each bearing comprises means for admitting pressurized fluid into at least two chambers of each plurality of chambers. Such two chambers of each plurality are disposed at opposite sides of a plane which includes the axes of the shell and second roll. These two chambers can be called tertiary chambers and can be provided in addition to the primary and secondary chambers or they can constitute portions of secondary chambers. In other words, each bearing can comprise a total of four chambers including a primary chamber, a secondary chamber and two tertiary chambers which alternate with the primary and secondary chambers. The subdividing means of each bearing can comprise a partition which is disposed between the respective two chambers and is located in or close to the plane including the axes of the shell and the second roll. Such assembly preferably further comprises signal generating sensor means for monitoring the positions of the baring members relative to the carrier, and means for adjusting the pressure in the two chambers of the respective pluralities of chambers in response to signals from the corresponding sensors.

The subdividing means can comprise rigid or elastic partitions. Furthermore, the subdividing means can comprise springs or their suitable resilient elements for biasing the partitions, and guide means for the partitions. For example, the guide means can be provided in or on the carrier.

Each bearing can comprise two partitions which are provided in the respective clearance and extend substantially at right angles to a plane which includes the axes of the shell and the second roll. The internal surfaces of bearing members in such assembly can include substantially flat portions which are parallel to the aforementioned plane and each of which abuts one of the partitions in the respective clearance.

Each of the bearings can further comprise means for evacuating pressurized fluid from the corresponding selected chamber so that the fluid can circulate through the selected chambers. This allows for more rapid changes of the pressure of fluid in the respective selected chambers.

The sealing means of each bearing can comprise a substantially radially inwardly extending collar which forms an integral or separable part of the respective bearing member. The sealing means can also include shoulders or end faces which are provided on the carrier and each of which abuts one of the bearing members. The sealing means can further comprise two substantially disc-shaped members which are provided on the carrier and each of which abuts the adjacent portion of the respective bearing member. The disc-shaped members and the respective bearing members can be provided with cooperating means for preventing rotation of the bearing members relative to the carrier.

The extent to which the bearing members are movable relative to the carrier in the radial direction of the shell is preferably small and need not exceed 10 mm. In accordance with a presently preferred embodiment of the improved assembly, the distances through which the bearing members are movable radially of the carrier are between 2-5 mm.

The assembly preferably comprises adjusting means for moving the end portions of the carrier toward and away from the second roll. The admitting means of such assembly preferably includes means for filling the selected chambers during a first stage of movement of the end portions of the carrier toward the second roll and for evacuating some of the fluid from the selected chambers during a next-following stage of movement of the end portions of the carrier toward the second roll. Such admitting means can include means for transferring fluid from the selected chambers into other chambers of the respective plurality of chambers during the aforementioned next-following stage. The admitting means preferably includes means for admitting pressurized fluid to the hydrostatic bearing means during the first stage of movement of the end portions of the carrier toward the second roll.

The novel features which are considered as characteristic of the invention are set forth in particular in the appended claims. The improved roll and the improved assembly themselves, however, both as to their construction and their mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary axial sectional view of a roll forming part of a first assembly which embodies the present invention, a portion of a second roll being shown in a side elevational view;

FIG. 2 is a transverse vertical sectional view as seen in the direction of the arrows from the line A—A in FIG. 1;

FIG. 3 is a fragmentary transverse vertical sectional view as seen in the direction of arrows from the line B—B of FIG. 1;

FIG. 4 is a fragmentary partly elevational and partly axial sectional view of a second assembly having a different hydrostatic bearing unit;

FIG. 5 is a transverse vertical sectional view of the assembly which is shown in FIG. 4 but having a slightly modified hydrostatic bearing unit;

FIG. 6 is a fragmentary axial sectional view of a roll in a third assembly, further showing means for admitting pressurized fluid into the chambers within one of the annular bearing members and means for regulating the pressure in such chambers;

FIG. 7 is a fragmentary transverse vertical sectional view similar to that of FIG. 3 but showing a different bearing;

DESCRIPTION OF THE PREFERRED EMBODIMENTS

Figure 8:
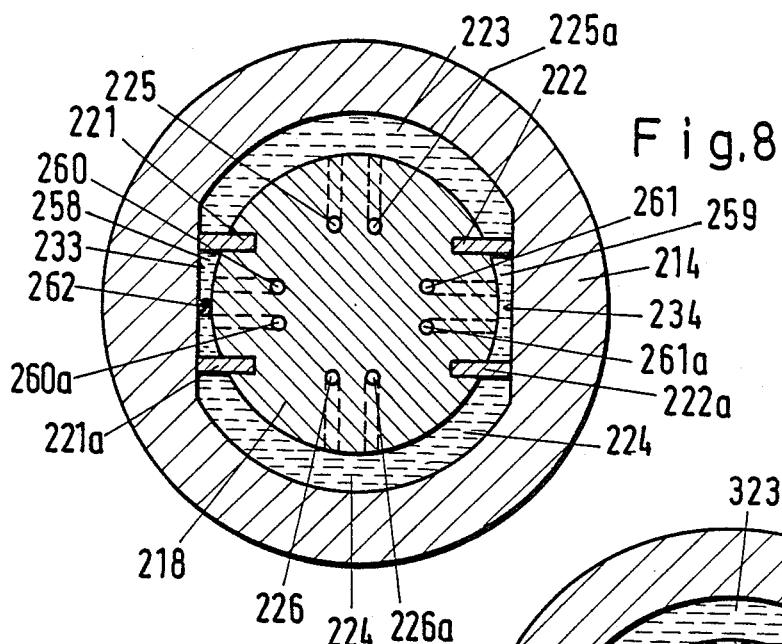
FIG. 8 is a sectional view similar to that of FIG. 8 but showing a further bearing.

Referring first to FIGS. 1 to 3, there is shown an assembly which can be utilized in a calender or in a like machine for the treatment of running webs of paper, textile material, foil or the like. The assembly comprises a first roll 1 and a second or counterroll G. The rolls 1 and G define an elongated nip S which is horizontal if the axes of the rolls 1 and the G are horizontal.

The roll 1 comprises a stationary carrier or support 3 the end portions 4 of which are mounted in spherical bearings 5 which, in turn, are mounted in upright frame members 6. FIG. 1 merely shows one end portion 4, one spherical bearing 5 and one framed member 6. The other end portion 4 of the carrier is mounted in a second bearing in a manner similar to that shown in the left-hand portion of FIG. 1. The carrier 3 is spacedly surrounded by a hollow cylindrical shell 2 the end portions of which extend toward but short of the respective frame members 6.

The hydrostatic bearing unit between the carrier 3 and the shell 2 of the roll 1 comprises two elongated partitions in the form of sealing strips 7 which subdivide the annular space 10 between the carrier 3 and the internal surface of the shell 2 into a pair of semicylindrical compartments or chambers. The upper compartment 11 is sealed from the lower compartment 12 by the radially outermost portions of the partitions 7 and 8. Each such partition can constitute a strip which is recessed into a radially inwardly extending groove or channel of the carrier 3 and the radially outermost portion of which abuts the internally surface of the rotary shell. The partitions 7 and 8 are disposed in a common plane which extends at right angles to the common plane 9 of the axes of the rolls 1 and G. At least the upper compartment 11 of the plurality of compartments (11 and 12) into which the space 10 between the carrier 3 and shell 2 is subdivided by the partitions 7,8 is filled with a pressurized hydraulic fluid, such as oil. The means for admitting pressurized fluid to the compartment 11 comprises a supply conduit 13 which is a channel or bore machined into the carrier 3. The fluid in the compartment 11 acts against the adjacent portion of the internal surface of the shell 2 and subjects the shell to a uniform pressure substantially all the way between the two axial ends of the roll 1. The upper compartment 11 can be called a primary or main plenum chamber which is filled with fluid when the assembly including the rolls 1 and G is in use. The fluid in the compartment 11 biases the peripheral surface 35 of the shell 2 against the peripheral surface of the upper roll G or against the underside of a running web which passes through the nip S.

Each end portion 4 of the carrier 3 has a larger-diameter section 18 which is disposed within the confines of the respective end portion of the shell 2 and is surrounded by a bearing including an annular bearing member 14 and an antifriction bearing 15, for example, a needle bearing, a roller bearing or a ball bearing. The races of each bearing 15 can surround one or more rows of rolling elements. Each of the bearings is constructed in such a way that it constitutes a combined radial and axial or thrust bearing. A radial seal 16 is installed in each end portion of the shell 2 outwardly adjacent the respective bearing 15 and surrounding the adjacent bearing member 14. The inner diameter of each bearing member 14 is selected in such a way that such inner surface and the external surface of the respective section 18 define an annular clearance 17 (see FIG. 3) which is subdivided into a plurality of chambers 23 and 24 by radially disposed partitions 21, 22 in the form of sealing strips received in radially inwardly extending grooves of the section 18.

Means is provided for sealing each clearance 17 from the surrounding atmosphere. Each sealing means comprises a radially inwardly extending collar 19 of the respective bearing member 14 which abuts the outer end face of the respective section 18 and has an internal groove for an O-ring 27 or another suitable sealing element. Another sealing element 28 in the form of an O-ring or the like is installed between the inner end face of each bearing member 14 and the adjacent disc-shaped member 20 at the respective axial end of the maximum-diameter central portion or section of the carrier 3. As can be seen in FIG. 3, the partitions 21 and 22 are disposed in a common plane which is a diametrical plane of the section 18 and extends at right angles to the plane 9 which is common to the axes of the rolls 1 and G. The upper chamber 23 is a primary or main plenum chamber of the illustrated bearing, and the lower chamber 24 is a secondary plenum chamber. The means for admitting pressurized fluid to the chambers 23 and 24 comprises supply conduits 25 and 26 which are machined into the respective end portion 4 and its section 18. The chamber 23 can receive or discharge fluid independently of the chamber 24 and vice versa.

The roll 1 further comprises means for preventing the bearing 15 and/or the radial seal 16 from rotating the bearing member 14 with the shell 2. Such rotation preventing means comprises projections or abutments at the outer side of each disc-shaped member 20 of the main portion of the carrier 3 and projections or abutments 29 on the adjacent portion of the respective bearing member 14. This can be seen in FIG. 1. For example, the abutments 30 can constitute surfaces flanking radially outwardly extending recesses or grooves machined into the inner end face of each bearing member 14, and the abutments 29 can constitute teeth which extend from the outer side of the respective disc-shaped member 20. The inwardly extending collar 19 of the bearing element 14 is connected with a cover or lid 31 which surrounds the smaller-diameter part of the end portion 4 of the carrier 3 and maintains a sealing element 32 (for example, an O-ring) in deformed condition. The sealing element 32 is received in a circumferential groove provided in the outer end face of the respective bearing member 14. Each cover or lid 31 can be affixed to the end portion 4 of the carrier 3 to further reduce the likelihood of rotation of the respective bearing member 14 with the associated bearing 15 and/or radial seal 16.

The partitions 21 and 22 can constitute relatively narrow strips which consist of or contain an elastic material. The arrangement may be such that each of the partitions 21, 22 is made entirely of a material which exhibits at least some elasticity. The internal surface of each annular bearing member 14 has flat portions 33 and 34 which abut the radially outermost portions of the respective partitions 21 and 22. The flat portions 33 and 34 of the internal surface of each bearing member 14 are disposed in planes which are disposed at opposite sides of and are parallel with the aforediscussed plane 9. It is not necessary that the dimensions of each lower chamber 24 match those of the respective upper chamber 23. The same applies for the compartments 11 and 12 between the internal surface of the shell 2 and the external surface of the central portion of the carrier 3.

When the assembly including the rolls 1 and G is in actual use, the compartment 11 contains a supply of pressurized fluid, the same as the plenum chambers 23 within the confines of the bearing members 14. The fluid in the compartment 11 and chambers 23 urges the shell 2 upwardly toward the peripheral surface of the second roll G. The useful portion of the peripheral surface 35 of the shell 2 extends well beyond the disc-shaped members 20 at the ends of the main or central portion of the carrier 3 and surrounds at lest the major portions of the bearing members 14. This can be readily seen in FIG. 1. The pressure in each chamber 23 can be regulated or adjusted independently of the pressure in the compartment 11 so as to ensure that the end portions of the shell 2 are biased toward the roll G with a desired force. As a rule, the effective length of the peripheral surface 35 of the shell 2 will be selected in such a way that the end portions of such surface surround at least the antifriction bearings 15 at both ends of the carrier 3.

The pressurized fluid in the secondary plenum chambers 24 ensures a desirable stabilization of the position of the shell 2 relative to the second roll G. This is due to the fact that pressurized fluid in the chambers 24 exerts a pressure against the adjacent portions of the internal surfaces of the respective bearing members 14 so that such bearing members are less likely to perform stray movements relative to the carrier 3 in the radial direction of the shell 2. In other words, the fluid in the chambers 23 and 24 exerts a pressure not only in a direction toward the nip S but also counter to such direction, i.e., downwardly as seen in FIGS. 1, 2 or 3, as well as transversely of such direction.

The magnitude of the force with which the peripheral surface 35 of the shell 2 is biased against the roll G or against a running web in the nip S can be regulated by utilizing rather rudimentary pressure regulating and fluid admitting and evacuating means (not shown in FIGS. 1 to 3). The end portions of the shell 2 are biased upwardly toward the nip S with a force which constitutes the difference between the forces generated by pressurized fluid in the respective chambers 23 and 24. In this manner, it is possible to select any one of a wide range of stabilizing forces for the end portions of the shell 2. Such selection of a desired stabilizing force does not necessitate any changes of pressure in the compartment 11 wherein the pressure is selected exclusively with a view to ensure that the web which advances through the nip S is acted upon with an optimum force such as is required for a particular type or treatment of running web or strip material. Moreover, it is possible to increase the pressure in the chambers 23 without altering the magnitude of stabilizing forces if the pressure in the associated lower chambers 24 is increased accordingly. All that counts is to ensure that the difference between the forces which are generated by fluid in the chambers 23 and 24 of a bearing member 14 remains unchanged. The forces in the chambers 23 and 24 can be altered if it is desired to shift the shell 2 and the bearing members 14 radially of the shell and relative to the carrier 3. The shell 2 and the bearing members 14 can be stopped and held in any desired position relative to the carrier 3. The pressure in the chambers 23 can be readily regulated in such a way that it counteracts the weight of the shell 2 and/or any parts which are used to drive the shell (if the shell is not driven by the running web in the nip S) so that the weight of the roll 1 cannot influence the force which the shell 2 and the roll G exert upon the respective sides of a running web.

An important advantage of the improved assembly is that the area of the internal surface of each bearing member 14 can be selected within a wide range so as to ensure that relatively low fluid pressures in the chambers 23 and 24 suffice to achieve the desired effects. Moreover, the pressure in the chambers 23 and 24 can be readily selected in such a way that the antifriction bearings 15 need not be subjected to excessive stresses. The same applies for the sealing elements 16, 27, 28 and 32. The bearing members 14 can stand stresses which are much more pronounced than permissible in conventional assemblies. This allows for the transmission of greater stresses to the rolls 1 and G.

In the embodiment of FIGS. 1, 2 and 3, the active or primary plenum chambers 23 are disposed at the same side of the axis of the carrier 3 as the compartment or chamber 11 of the hydrostatic bearing unit. Furthermore, the primary plenum chambers 23 are adjacent to the same portions of the carrier 3 (as seen in the circumferential direction of the roll 1) as the compartment 11 of the hydrostatic bearing unit. This will be readily understood by bearing in mind that the plane of the partitions 7 and 8 coincides or is closely adjacent to the common plane of the partitions 21 and 22. Thus, the compartment 11 extends along an arc of approximately 180° above the upper half of the main portion of the carrier 3, and the active plenum chambers 23 extend along arcs of approximately 180°, again in the region of the upper half of the carrier 3. Such distribution of compartment 11 and chambers 23 is often desirable because the end portions of the shell 2 are supported from within in the same way as the central portion which surrounds the chamber 11. Moreover, the chambers 23 render it possible to prolong the effective portions of the peripheral surface 35 of the shell 3, as considered in the axial direction of the roll 1.

The pressure of fluid in the chambers 23 not only serves to ensure proper positioning of the respective bearing members 14 but can also serve as a means for ensuring desirable internal proping of the respective end portions of the shell 2. In other words, the chambers 23 can be said to perform functions which are analogous to that of the compartment 11. The illustrated construction further ensures that the weight per useful unit length of the roll 1 is less than in a conventional roll. As mentioned above, the pressure of fluid in the chambers 23 can counteract any undesirable influences of the weight of the shell 2 upon the force which is to be applied against a running web in the nip S as well as the influence of means for driving the shell 2 if the shell is positively driven. The feature that the chambers 23 and 24 extend along large arcs (approximately 180°) contributes to stability of the bearings at the ends of the carrier 3.

It is also within the purview of the invention to utilize the lower chambers 24 as primary plenum chambers so that the primary plenum chambers are then disposed at one side and the compartment 11 is disposed at the other side of the axis of the carrier 3 and shell 2. The chambers 24 then serve primarily to stabilize the position of the shell 2. The stabilizing action is highly satisfactory because each of the chambers 24 extends along a relatively large arc (nearly 180°). The pressure of fluid in the chambers 24 invariably tends to maintain or to move the respective bearing members 14 to optimum positions relative to the carrier 3. This is tantamount to maintaining the end portions of the shell 2 in optimum positions with reference to the sections 18 of the respective end portions 4 of the carrier 3.

FIG. 4 shows a portion of a modified roll (again denoted by the character 1) wherein the hydrostatic bearing unit comprises a row of hydrostatic bearing elements 36 adjacent the uppermost portion of the internal surface of the shell 2 and groups of means for biasing the bearing elements 36 upwardly, as seen in FIG. 4. The biasing means comprises pistons 39, 40 which are secured to or supported by the carrier 3 and extend into cylinder chambers provided therefor in the respective bearing elements 36. FIG. 5 shows one of the presently preferred distributions of means for biasing the bearing elements 36 toward the internal surface 38 of the shell 2. Such biasing means are similar to or identical with those disclosed in commonly owned U.S. Pat. No. 4,394,793 granted July 26, 1983 to Pav et al. The disclosure of this patent is incorporated herein by reference. As shown in FIG. 5, the pistons 39 and 40 for a selected hydrostatic bearing element 36 are disposed side by side (as seen in the circumferential direction of the carrier 3) and extend into cylinder chambers 41 and 42 which are machined into or otherwise formed in the underside of the respective bearing element 36. The cylinder chambers 41 and 42 communicate with discrete pockets 45, 46 which are machined into the upper surface 37 of the bearing element 36. The means for establishing communication between the cylinder chambers 41, 42 and the respective pockets 45, 46 includes flow restrictors 43 and 44 which are machined into or otherwise formed in the respective bearing element 36. The cylinder chambers 41 and 42 respectively receive pressurized hydraulic fluid by way of supply conduits 47 and 48 which are formed in the carrier 3.

An important advantage of rows of hydrostatic bearing elements 36 or analogous elements is that the pressure with which the shell 2 bears against a web in the nip S between the rolls 1 and G can be selected with a high degree of precision in any one of several portions of the nip. The plenum chambers 23 in the respective bearing members 14 again contribute to an increase of effective length of the peripheral surface of the shell 2 well beyond the outermost hydrostatic bearing elements 36.

The difference between the embodiments of FIGS. 4 and 5 is that the space between the internal surface 38 of the shell 2 and the peripheral surface of the carrier 3 of the roll 1 which is shown in FIG. 4 merely serves to collect the fluid medium which escapes from the pockets 45 and 46 of the hydrostatic bearing elements 36. On the other hand, the carrier 3 of the assembly which is shown in FIG. 5 is provided with radially extending partitions 7 and 8 which define a compartment 11 receiving a pressurized fluid medium independently of the fluid medium which is admitted to the cylinder chambers 41 and 42 by way of the respective supply conduits 47 and 48. This contributes, even further, to the versatility and utility of the assembly including the rolls 1 and G of FIG. 5. An advantage of the compartment 11 which is shown in FIG. 5 is that the fluid therein need not be maintained at an elevated pressure because the action of such fluid is assisted by the bearing elements 36 as well as by fluid in the two plenum chambers 23. The arrangement is preferably such that the fluid in compartment 11 and chambers 23 furnishes the major part of the force which is necessary to stabilize the shell 2 as well as to bias the shell toward the roll G. The hydrostatic bearing elements 36 are then used primarily to carry out corrective measures, if and when necessary.

An important advantage of hydrostatic bearing elements 36 which are acted upon by several biasing means (such as pairs of pistons 39 and 40) is that such bearing elements furnish a highly desirable stabilizing action which can be assisted by the stabilizing action of fluid in the chambers 24. The stabilizing effect can be varied within a desired range, for example, by evacuating pressurized fluid from or by admitting pressurized fluid into the chambers 24. The stabilizing forces act substantially at right angles to the plane 9 (not shown in FIGS. 4 and 5). The stabilizing action is determined by the sum of forces in contrast to the force acting upon the running web which is determined by the difference of forces acting upwardly toward the roll G and in the opposite direction.

It is desirable to provide means which can allow for a regulation of pressure in the compartment 11 and in each of the plenum chambers 23 and 24. Furthermore, it is desirable to provide means for changing or regulating the pressure in the cylinder chambers 41 and 42 for each of the hydrostatic bearing elements 36.

FIG. 6 shows schematically one of the presently preferred embodiments of means for adjusting or regulating the pressure in the cylinder chambers 41, 42 and plenum chambers 23, 24. The difference between the embodiments of FIGS. 4 and 6 is primarily that the annular bearing member 14 which is shown in FIG. 6 abuts directly against an end face or shoulder 49 of the main portion of the carrier 3. The shoulder or end face 45 deforms a ring-shaped sealing member which surrounds the plenum chambers 23 and 24 within the confines of the bearing member 14. The supply conduits 25, 26, 47, 48 which respectively communicate with the plenum chambers 23, 24 and cylinder chambers 41, 42 receive fluid by way of pressure regulating valves 50, 51, 52, 53 disposed downstream of a pump 54 which can be said to constitute a source of pressurized fluid. The valves 50–53 can be adjusted by hand or automatically in response to signals from suitable devices which monitor the width of selected portions of the nip S, the characteristics of longitudinally extending portions of the running web, the temperature of selected portions of the shell 2 and/or other parameters. The monitoring means can also ascertain the temperature of pressurized fluid in the respective chambers, the pressure of such fluid, the positions of annular bearing members 14 relative to the carrier and/or other data.

It is often preferred to maintain the chamber 23 at a pressure which is different from the pressure in the chamber 24. This can be readily accomplished by mounting a pressure difference regulating device 55 between the conduits 25 and 26. The pressure difference regulating device 55 can operate in such a way that the pressure of fluid in the chamber 23 exceeds the pressure of fluid in the chamber 24 or vice versa. As a rule, or at least in many instances, it is preferred to set the device 55 in such a way that the pressure in the chamber 23 exceeds the pressure in the chamber 24.

Instead of supplying fluid to the cylinder chambers 41, 42 the conduits 47, 48 of FIG. 6 can supply fluid to the compartments 11, 12 of the roll 1 which is shown in FIGS. 1–3.

FIG. 7 shows a modified bearing wherein all such parts which are identical with or are clearly analogous to the corresponding parts of the previously described bearings are denoted by similar reference characters plus 100. The partitions 121 and 122 are relatively narrow sealing strips which are guided by the surfaces surrounding radially extending grooves in the carrier section 118, and each partition is biased radially outwardly by one or more coil springs or other suitable biasing elements 156, 157 installed in the deepmost portions of the respective recesses. The radially outermost portions of the partitions 121 and 122 abut arcuate portions 134 of the cylindrical internal surface 133 of the bearing member 114.

Since the partitions 121 and 122 are permanently biased by the respective springs 156 and 157, they bear against the adjacent arcuate portions 134 of the internal surface 133 of the bearing member 114. The springs 156 and 157 enable the respective partitions 121, 122 to yield slightly if the bearing member 114 is moved up or down, as seen in FIG. 7.

FIG. 7 further shows that the upper chamber 23 communicates with two conduits 125 and 125a one of which admits pressurized fluid and the other of which evacuates pressurized fluid. This enables the pressurized fluid to circulate through the chamber 23. The conduits 126 and 126a allow for circulation of a pressurized fluid through the lower chamber 24. This renders it possible to rapidly change the pressure in the chamber 123 or 124 and/or the volume of one of these chambers. If the volume of the chamber 123 is reduced, the volume of the chamber 124 is increased accordingly, and vice versa.

An important advantage of the bearing which is shown in FIG. 7 is that simultaneous activation of the chambers 123 and 124 in such a way (see FIG. 6) that the pressure in the chamber 123 exceeds the pressure in the chamber 124 ensures that the bearing member 114 can be held in an optimum position relative to the carrier section 118. The pressure differential between the chambers 123 and 124 ensures that the shell (not shown in FIG. 7) bears upon the web in the nip S with a requisite force, not only in the region between the two bearings but also in the regions outwardly adjacent the bearing members 114.

FIG. 8 shows a modified bearing wherein the parts which are similar to those shown in FIGS. 1–6 are denoted by similar reference characters plus 200. The clearance between the bearing member 214 and the section 218 of the carrier is subdivided into four chambers including a main plenum chamber 223, a secondary plenum chamber 224 and two tertiary plenum chambers 258 and 259. The chambers 223, 224 alternate with the chambers 258, 259. The subdividing means comprises a total of four partitions 221, 221a, 222 and 222a. The radially outermost portions of the partitions 221, 221a abut a flat portion 253 of the internal surface of the bearing member 214, and the radially outermost portions of the partitions 222, 222a abut a flat portion 234 of the internal surface of the member 214. The flat portions 233, 234 are parallel to the aforediscussed plane 9 (not specifically shown in FIG. 8). The means for circulating pressurized fluid in the tertiary chamber 258 comprises conduits 260, 260a. Conduits 261, 261a are provided to circulate pressurized fluid through the chamber 259.

FIG. 8 further shows a sensor 262 which is installed in the chamber 258 and monitors the position of the annular bearing member 214 relative to the section 218 of the carrier. It is equally possible to place one or more sensors adjacent the external surface of the shell, for example, between an actuator which is connected to the shell and an actuator which is connected with the bearing member 214. Still further, one or more sensors can be installed in the chamber 259 instead of or in addition to the sensor 262 in the chamber 258. The sensors transmit signals which are processed and used to ensure that the bearing member 214 is properly centered relative to the section 218 of the carrier. The means for transmitting signals from the sensor 262 to the means for controlling the pressure of the fluid which is admitted to the chambers 258 and 259 is not specifically shown in the drawing. It will be noted that the chambers 258 and 259 are disposed at opposite sides of the vertical plane which includes the axis of the carrier section 218 and the axis of the second roll G (not shown in FIG. 8).

Figure 9:
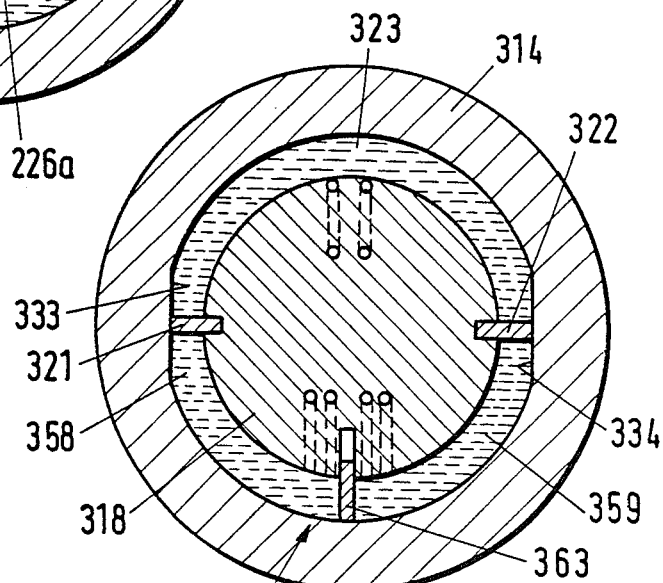
FIG. 9 is a similar sectional view but showing still another bearing.

Similar results can be achieved with the bearing which is shown in FIG. 9 and the parts of which are denoted by the same characters as in FIG. 8 plus 100. This bearing comprises a large primary plenum chamber 323 which extends along an arc of approximately 180°, and a similarly dimensioned secondary plenum chamber 324 which is subdivided into a pair of tertiary plenum chambers 358, 359 by a partition 363 in the form of a sealing strip which is movable radially of the carrier section 318 in a slot or groove machined into the lowermost portion of the carrier section 318. The pressure in the chambers 358 and 359 can be readily regulated in such a way that the fluid in the secondary plenum chamber 324 stabilizes the bearing member 314 relative to the section 318 as well as that the fluid in the plenum chambers 358 and 359 offers a required resistance to lateral shifting of the bearing member 314 relative to the carrier section 318, namely in directions at right angles to the plane including the axis of the carrier and the axis of the second roll G (not shown in FIG. 9).

An advantage of the bearings which are shown in FIGS. 8 and 9 is that the tertiary chambers 258, 259 or 358, 359 ensure proper positioning of the bearing member 214 or 314 in directions at right angles to the plane which includes the axes of the two rolls. The tertiary chambers allow for rapid and accurate return movement of the bearing member 214 or 314 to its optimum position relative to the carrier section 218 or 318.

An advantage of elastically deformable partitions is that they ensure highly reliable sealing of neighboring chambers from each other. If desired, each partition or some of the partitions can be inserted into suitable guide means recessed into the section of the carrier, into the respective annular bearing member or into both. The utilization of springs (such as the springs 156, 157 of FIG. 7) renders it possible to ensure the establishment of a highly satisfactory sealing action, even if the partitions exhibit little or no elasticity.

It will be readily appreciated that the end face 49 of the carrier and the radially inwardly extending collar 19 of a bearing member constitute but some of the elements which can be used to seal the annular clearances between the bearing members and the carrier from the surrounding atmosphere. Other sealing means can be used with similar or equal advantage. The disc-shaped members 20 (see FIG. 1) constitute one of the presently preferred components of the means for sealing the annular clearances from the surrounding atmosphere. Such disc-shaped members can perform the dual function of sealing the clearances from the atmosphere as well as of positively preventing the respective annular bearing members from rotating with the shell.

The stroke of a bearing member radially of the shell in a direction toward or away from the second roll G need not be large. As a rule, the stroke need not exceed 10 mm and is preferably between 2 and 5 mm. Such relatively short strokes suffice to allow for adequate opening of the nip S. Due to these relatively short distances which the bearing members cover relative to the associated carrier in directions radially of the shell, it is not necessary to employ parallel sealing surfaces. In other words, it suffices to employ sealing surfaces which have an arcuate (particularly part cylindrical) shape.

Figures 10, 11, 12:
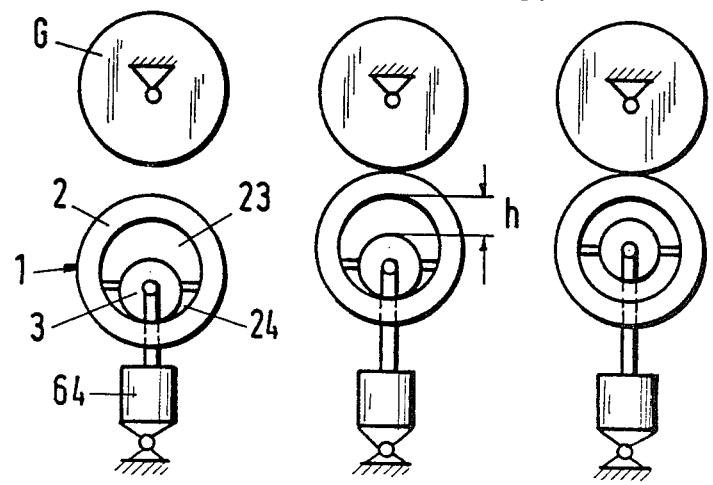
FIG. 10 is a schematic end elevational view showing the initial position of the shell of one of the rolls relative to the associated second roll.
FIG. 11 shows the structure of FIG. 10 but with the shell of the first roll in a position it assumes upon completion of the first stage of movement toward the second roll.
FIG. 12 illustrates the structure of FIGS. 10 and 11 but showing the shell of the lower roll in a position upon completion of the second stage of movement toward the second roll.

Referring to FIGS. 10, 11 and 12, there is shown a presently preferred type of means for moving the roll 1 relative to the roll G so as to increase or reduce the width of the nip between the roll G and the shell 2. The roll 1 is mounted on two hydraulic adjusting units 64, one at each end of the carrier 3. The adjusting units 64 can lift or lower the frame members 6 (FIG. 1) for the respective spherical bearings 5. Each adjusting unit 64 includes four pressure regulating valves 50–53 and a pressure difference regulating device 55 of the type shown in FIG. 6.

During the initial stage of adjustment of the roll 1 relative to the roll G, the upper plenum chambers 23 are filled with hydraulic fluid medium so that the volume of each of the two secondary plenum chambers 24 is reduced to a minimum. At the same time, the hydraulic adjusting units 64 maintain the carrier 3 at a maximum distance from the upper roll G. The hydraulic adjusting units 64 simultaneously admit pressurized fluid into the compartment 11 (see FIG. 1) at such pressure that the central portion of the shell 2 is bent upwardly in a direction toward the roll G.

In the next step, the hydraulic adjusting units 64 are actuated to lift the carrier 3 from the position of FIG. 10 to the position of FIG. 11 so that the peripheral surface of the shell 2 contacts the roll G (or the web in the nip between the rolls 1 and G). Since the central portion of the shell 2 bulges upwardly, such central portion is first to contact the peripheral surface of the roll G. Consequently, a web in the nip between the rolls 1 and G is not damaged in response to further upward movement of the carrier 3 from the position of FIG. 11 to the position of FIG. 12. The upward movement of the carrier 3 is terminated when the axis of the shell 2 is exactly parallel to the axis of the upper roll G, i.e., when the bulge in the median portion of the shell 2 disappears. The upward movement of the carrier 3 from the position of FIG. 11 to the position of FIG. 12 entails a reduction of the volume of the plenum chamber 23 and a simultaneous increase of the volume of the plenum chamber 24. When the carrier 3 reaches the position of FIG. 12, any further adjustments are carried out in the aforedescribed manner, namely by altering the pressure in the compartment 11 and/or in the chamber 23 and/or 24.

The reference character h denotes the stroke of the carrier 3 after the median portion of the shell 2 has contacted the web in the nip or the peripheral surface of the upper roll G. As mentioned above, such stroke need not exceed 10 mm and is preferably between 2–5 mm.

The arrangement which is shown in FIGS. 10–12, namely that the stroke h need not exceed 10 mm, is desirable and advantageous because this allows for rapid and accurate orientation of the shell 2 relative to the upper roll G. Furthermore, this renders it possible to employ a shell 2 having relatively small inner and outer diameters which, in turn, contributes to a reduction of the overall weight of the shell 2. A relatively small and thin-walled shell 2 is more readily deformable because its stiffness is not pronounced. Accordingly, changes of pressure in the compartment 11 and/or chamber 23 and/or 24 allow for rapid and accurate changes in the configuration of the shell 2 so as to conform such configuration to the requirements as regards the application of pressure to a web which is running through the nip of the rolls 1 and G. A relatively thin-walled and not overly rigid shell 2 renders it possible to regulate the magnitude of forces, which act upon the web in the nip of the rolls 1 and G, with a very high degree of precision. The pressure per unit area of the web in the nip S can be increased in accordance with a reduction of the outer diameter of the shell 2 (Herzian pressure) while the pressure in the chambers 23 and compartment 11 remains unchanged. The just described configuration and dimensioning of the shell 2 render it possible to provide a roll 1 having nearly ideal pressure regulating characteristics.

The operation of the adjusting units 64 is preferably such that the fluid which is expelled from the upper chamber 23 during movement of the carrier 3 from the position of FIG. 11 to the position of FIG. 12 is caused to enter the lower chamber 24. The aforediscussed bulging of the central portion of the roll 2 in response to admission of pressurized fluid into the compartment 11, while the carrier 3 moves from the position of FIG. 10 to the position of FIG. 11, not only reduces the likelihood of damage to the web but also the likelihood of breakage of the web in the nip S.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An assembly for treating running webs, particularly for use in calenders and the like, comprising a roll including an elongated carrier; means for non-rotatably supporting said carrier; a hollow deformable rotary cylindrical shell surrounding said carrier; hydrostatic bearing means interposed betwen said carrier and said shell; and first and second bearings interposed between said shell and said carrier and flanking said bearing means, each of said bearings including an annular bearing member non-rotatably mounted on and surrounding said carrier and movable relative to said carrier radially of said shell, said shell having end portions which at least partially surround said bearing members, each of said bearing members and said carrier defining an annular clearance, means for sealing said clearances from the atmosphere including substantially radially inwardly extending collars provided on said bearing members, means for subdividing each of said clearances into a plurality of chambers, said subdividing means extending across the respective clearances between said carrier and the respective bearing members, a source of pressurized fluid, and means for admitting the fluid from said source into at least one selected chamber of each of said pluralities of chambers.

2. The assembly of claim 1, wherein said bearing members have outer end portions remote from said bearing means and said sealing means includes means for sealing said clearances in the regions of the outer end portions of the respective bearing members, said bearing members having internal surfaces which are acted upon by pressurized fluid in the respective selected chambers.

3. The assembly of claim 1, wherein said bearing means extends longitudinally of said shell between predetermined portions of said bearing members, said selected chambers being surrounded by said predetermined portions of the respective bearing members.

4. The assembly of claim 3, further comprising a second roll defining with said shell an elongated nip adjacent said bearing means and said portions of said bearing members, the pressurized fluid in said selected chambers being arranged to bias the end portions of said shell in a direction to reduce the width of the corresponding portions of said nip.

5. The assembly of claim 1, wherein said bearing means and said selected chambers are disposed at opposite sides of said carrier.

6. The assembly of claim 1, wherein said bearing means comprises a row of hydrostatic bearing elements adjacent the internal surface of said shell and a plurality of pressure generating units acting between said carrier and each of said bearing elements to urge the respective bearing elements toward the internal surface of said shell.

7. The assembly of claim 1, wherein said bearing means includes a compartment disposed between said shell and said carrier and extending longitudinally of said shell intermediate said bearing members.

8. The assembly of claim 7, wherein said bearing means further comprises elongated sealing devices interposed between said shell and said carrier, flanking said compartment and spaced apart from each other in the circumferential direction of said shell.

9. The assembly of claim 1, further comprising means for adjusting the pressure of fluid in at least one of said selected chambers.

10. The assembly of claim 1, wherein said bearings further comprise means for admitting pressurized fluid to at least one second chamber of each of said plurality of chambers and means for maintaining the fluid in said selected chambers at a pressure higher than in said second chambers.

11. The assembly of claim 1, further comprising a second roll defining with said shell an elongated nip, each of said bearings including means for admitting the fluid into at least two chambers of each of said pluralities of chambers, said two chambers of each of said pluralities being disposed at opposite sides of a plane including the axes of said shell and said second roll.

12. The assembly of claim 11, wherein each of said pluralities of chambers further comprises two additional chambers alternating with the respective two chambers, each of said bearings further comprising means for admitting fluid to at least one of the respective additional chambers.

13. The assembly of claim 11, wherein each of said subdividing means comprises a partition disposed between the respective two chambers and located in or close to said plane.

14. The assembly of claim 11, further comprising signal generating sensor means for monitoring the positions of said bearing members relative to said carrier and means for adjusting the pressure in said two chambers of the respective pluralities of chambers in response to signals from the corresponding sensors.

15. The assembly of claim 1, wherein said subdividing means comprises elastic partitions.

16. The assembly of claim 1, wherein said subdividing means comprises spring-biased partitions and guide means for said partitions.

17. The assembly of claim 16, wherein said guide means are provided on or in said carrier.

18. The assembly of claim 1, further comprising a second roll defining with said shell an elongated nip which is parallel to the axis of said second roll, said subdividing means comprising a pair of partitions provided in each of said clearances and extending substantially at right angles to a plane including the axes of said shell and said second roll, each of said bearing members having an internal surface including substantially flat portions parallel to said plane and each abutting one of said partitions in the respective clearance.

19. The assembly of claim 1, wherein each of said bearings further comprises means for evacuating pressurized fluid from the corresponding selected chamber so that the fluid can circulate through said selected chambers.

20. The assembly of claim 1, wherein said carrier has two shoulders and each of said bearing members abuts one of said shoulders.

21. The assembly of claim 1, wherein said carrier comprises two substantially disc-shaped members and each of said bearing members abuts one of said disc-shaped members, said disc-shaped members and the respective bearing members having means for preventing rotation of said bearing members relative to said carrier.

22. The assembly of claim 1, wherein said bearing members are movable relative to said carrier substantially radially of said shell through distances of up to 10 mm in response to admission of pressurized fluid into the respective selected chambers.

23. The assembly of claim 22, wherein said distances are in the range of 2-5 mm.

24. The assembly of claim 1, further comprising a second roll defining with said shell an elongated nip, said carrier having end portions and further comprising means for moving said end portions toward and away from said second roll, said admitting means including means for filling said selected chambers during a first stage of movement of said end portions toward said second roll and for evacuating some of the fluid from said selected chambers during a next-following stage of movement of said end portions toward said second roll.

25. The assembly of claim 24, wherein said admitting means includes means for transferring fluid from said selected chambers into other chambers of the respective pluralities of chambers during said next-following stage.

26. The assembly of claim 24, wherein said admitting means includes means for supplying pressurized fluid to said hydrostatic bearing means during said first stage.

* * * * *